June 11, 1968     J. H. SAUNDERS     3,388,032
LAMINATED SAFETY GLASS
Filed Jan. 13, 1965
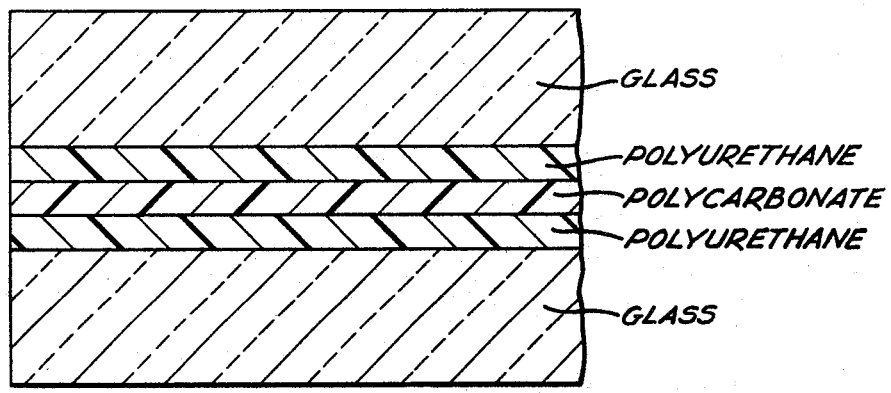
INVENTOR.
JAMES H. SAUNDERS
BY
ATTORNEYS.

United States Patent Office 3,388,032
Patented June 11, 1968

3,388,032
LAMINATED SAFETY GLASS
James H. Saunders, Bridgeville, Pa., assignor to Mobay Chemical Company, Pittsburgh, Pa., a corporation of Delaware
Filed Jan. 13, 1965, Ser. No. 425,295
11 Claims. (Cl. 161—183)

ABSTRACT OF THE DISCLOSURE

Laminates of polyaryl carbonate and polyurethane including laminated articles wherein the polycarbonate is bonded to glass with a polyurethane interlayer.

---

This invention relates to a laminated article and more particularly to the lamination of polycarbonate and glass.

It has been proposed heretofore to prepare safety glass using polycarbonate as an interlayer. However, the resulting safety glass is impractical because of insufficient bond strength when the polycarbonate is bonded directly to glass but principally because the polycarbonate and glass have different co-efficients of thermal expansion. A safety glass made by bonding polycarbonate directly to glass will crack and craze on cooling from the temperature necessary to bond the two together due to the different thermal expansion co-efficients.

When it has been attempted to use polyvinyl butyral as an interlayer between the polycarbonate and the glass, the adhesion is insufficiently improved unless a plasticizer is used. When a plasticizer is used, then the plasticizer often causes the polycarbonate to develop stress cracks and to have low light transmission properties.

It is, therefore, an object of this invention to provide a laminated article based on a polyarylcarbonate and glass as well as precursor laminates which are free of the foregoing disadvantages. Another object of this invention is to provide a glass which has high load bearing properties. A still further object of this invention is to provide a laminated article of polycarbonate and glass which has good adhesion and which is transparent and resistant to breakage. Still another object of this invention is to provide a laminated article of polycarbonate and glass which has good strength properties over a wide temperature range.

These and other objects of the invention will become apparent from the following description and the accompanying drawing.

The foregoing objects and others are accomplished in accordance with this invention, generally speaking, by providing a laminated article comprising a polyarylcarbonate and a polyurethane. Thus, laminates comprising a polyarylcarbonate bonded to glass or other pellucid sheet-like material with a polyurethane are provided as well as precursor laminates adapted to prepare such a laminated article. Therefore, this invention contemplates as a preferred embodiment a laminated article of polyarylcarbonate, polyurethane and glass. The laminated article of the present invention is preferably made up of five sheets: two of glass, two of polyurethane and one of polyarylcarbonate. The polyarylcarbonate forms the center layer which is sandwiched between two sheets of polyurethane which is in turn sandwiched between two sheets of glass. Still further the invention contemplates a prelaminate of part of the sheets which form the final laminate. For example, it is possible to sandwich a sheet of polyarylcarbonate between two sheets of polyurethane in accordance with the invention by lightly or even firmly pressing them together. This three part prelaminate which is in and of itself new and useful may then be used either immediately or at a much later time as an interlayer for the glass or glass-like sheets to prepare the multiple laminate. The preliminary sandwich in particular has the advantage of being prepared at one location by specialists in the thermoplastics field for use by laminators subsequently at another location. In addition to the foregoing economic and practical desirability for making a prelaminate, there is an unexpected technical advantage also. The prelaminate is much easier to adhere to glass because the polyarylcarbonate cannot take up moisture after being sandwiched between the sheets of polyurethane. The process steps desirable for adhering polyurethane to polyarylcarbonates are not always satisfactory for adhering polyurethane to glass. By making a prelaminate one overcomes these difficulties.

The polyurethane is the crux of the present invention. It is well known to laminate glass with various plastics including plasticized polyvinyl acetals. However, the conventionally plasticized polyvinyl acetals, for example, polyvinyl butyral containing triethylene glycol di-(2-ethyl butyrate) is unsatisfactory for laminating glass to polycarbonate. The laminated structure based on the conventional plasticized polyvinyl butyral develops stress cracks in the polyarylcarbonate in a short time and soon the amount of light transmission through the laminated article drops below permissible levels. When polyurethane is used, the adhesion of glass to the polyarylcarbonate is satisfactory and yet there is no stress cracking or cloudiness developed in the product.

The laminated article of this invention takes advantage of the unusual mechanical properties of glass. Thus, in accordance with this invention the function of the polycarbonate is not purely structural. The function of the polycarbonate is to make the glass function as a structure bearing member even when shattered. Thus, the laminated article of this invention retains a large percentage of its load bearing properties even after the glass has been shattered so that a car body can be constructed where the front and rear windows serve as the sole supporting members of the roof. Such a car body dropped on its top will shatter the glass, but the load bearing properties of the laminated glass are retained sufficiently so that the roof is supported by this main load bearing column. Further illustrations of utility include airplane windshields, load-bearing walls of buildings, partitions, and the like.

The polycarbonate may be any suitable film of polycarbonate such as that disclosed in U.S. Patents 3,028,365 and 3,117,019 and is preferably prepared by reacting di-(monohydroxyaryl)-alkanes with derivatives of the carbonic acid such as phosgene and bischloro-carbonic acid esters of di-(monohydroxyaryl)-alkanes.

The aryl residues of the di-(monohydroxyaryl)-alkanes can be alike or different. The aryl residues can also carry substituents which are not capable of reacting in the conversion into polycarbonates, such as halogen atoms or alkyl groups, for example, the methyl, ethyl, propyl, or tert. butyl group. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4' - dihydroxy - diphenyl) - methane, 2,2-(4,4'-dihydroxy - diphenyl) - propane, 1,1 - (4,4' - dihydroxy-diphenyl)-cyclohexane, 1,1 - (4,4' - dihydroxy - 3,3' - di-methyl - diphenyl) - cyclohexane, 1,1 - (2,2' - dihydroxy-4,4' - dimethyl - diphenyl) - butane, (boiling point: 185–188° C. under 0.5 mm. mercury gauge) 2,2(2,2'-dihydroxy-4,4'-di-tert.-butyl-diphenyl)-propane or 1,1'-(4,4'-dihydroxy - diphenyl) - 1 - phenyl - ethane, furthermore, methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4' - dihydroxy - diphenyl) - pentane (melting point 149–150° C.), 3,3 - (4,4' - dihydroxy-diphenyl)-pentane, 2,2 - (4,4' - dihydroxy - diphenyl) - hexane, 3,3-(4,4'-dihydroxy - diphenyl) - hexane, 2,2 - (4,4' - dihydroxy-diphenyl) - 4 - methyl - pentane (melting point 151–152° C.), 2,2 - (4,4' - dihydroxy - diphenyl) - heptane (boiling point 198–200° C. under 0.33 mm. mercury gauge), 4,4-(4,4' - dihydroxy - diphenyl) - heptane (melting point 148–149° C.), or 2,2 - (4,4' - dihydroxy - diphenyl)-tridecane. Suitable di-(monohydroxyaryl)-alkanes the two aryl residues of which are different are for example 2,2-(4,4'-dihydroxy - 3' - methyl - diphenyl)-propane and 2,2 - (4,4' - dihydroxy - 3 - methyl-3'-isopropyl-diphenyl)-butane. Suitable di-(monohydroxyaryl)-alkanes the aryl residues of which carry halogen atoms are for instance 2,2 - (3,5,3',5' - tetra - chloro - 4,4'-dihydroxy-diphenyl)-propane, 2,2 - (3,5,3',5' - tetrabromo - 4,4' - dihydroxy-diphenyl)-propane, (3,3' - dichloro - 4,4' - dihydroxy-diphenyl)-methane and 2,2' - dihydroxy - 5,5' - difluoro-diphenyl - methane. Suitable di - (monohydroxyaryl)-alkanes the alkyl residue of which linking the two benzene rings is substituted by an aryl residue are for instance (4,4' - dihydroxy-diphenyl)-phenyl-methane and 1,1-(4,4'-dihydroxy-diphenyl)-1-phenyl-ethane.

In order to obtain special properties, mixtures of various di-(monohydroxyaryl)-alkanes can also also be used, thus mixed polycarbonates are obtained.

The conversion of the aforesaid di-(monohydroxyaryl)-alkanes into high molecular high molecular polycarbonates by reacting with the mentioned derivates of the carbonic acid may be carried out as known in the art. For instance the di-(monohydroxyaryl)-alkanes can be re-esterified with carbonic acid diesters, e.g., dimethyl-, diethyl-, dipropyl-, dibutyl-, diamyl-, dioctyl-, dicyclohexyl-, diphenyl- and di-o,p-tolyl carbonate at elevated temperatures from about 50 to about 320° C. and especially from about 120 to about 280° C.

The polycarbonates can also be produced by introducing phosgene into solutions of di-(monohydroxyaryl)-alkanes in organic bases, such as dimethylaniline, diethylaniline, trimethylamine and pyridine, or into solutions of di-(monohydroxyaryl)-alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate, and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di-(monohydroxyaryl)-alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of phosgene.

Finally, it is also possible to react the di-(monohydroxyaryl)-alkanes with about equimolecular amounts of bischoloro carbonic acid esters of di-(monohydroxy-aryl)-alkanes under corresponding conditions.

In the production of polycarbonates according to the various processes it is advantageous to employ small amounts of reducing agents, for example, sodium-, or potassium-sulphide, -sulphite and dithionite or free phenol and p-tert. -butylphenol.

By adding monofunctional compounds which are capable of reacting with phosgene or with the end groups of the polycarbonates consisting of the chlorocarbonic acid ester group and which terminate the chains, such as the phenols for instance the phenol, the tert. -butyl-phenol, the cyclohexylphenol, and 2,2-(4-hydroxyphenol-4'-methoxy-phenyl)-propane, further aniline and methyl-aniline, it is possible to regulate the molecular weight of the polycarbonates in wide limits.

The reaction of the di-(monohydroxyaryl)-alkanes with phosgene or of the chlorocarbonic esters of the di-(monohydroxyaryl)-alkanes may be carried out at room temperature or at lower or elevated temperatures, that is to say at temperatures from the freezing point to the boiling point of the mixture. (Column 1, line 31 to Column 3, line 1 of 3,028,365.) The polycarbonate film preferably has a thickness of from about 5 to about 250 mils and most preferably from about 60 to about 100 mils. In some cases it may be desirable to use copolymers of various dihydroxy aryl propanes in order to achieve special properties.

Other pellucid materials are disclosed in U.S. Patent 3,069,301 at Column 1, lines 62–68 which are rigid and resistant to scratching and essentially non-hydroscopic.

The glass used is preferably prestressed and preferably has a thickness of from about 60 to about 125 mils. Tempered glass is desirable and glass which has been specially tempered, for example, according to the method of U.S. Patent 2,779,1366 is desirable. The glass sold under the trade name Chemcor by the Corning Glass Works is suitable.

The polyurethane is preferably in sheet form and preferably has a thickness of from about 10 to 45 mils most perferably about 12 to 18 mils. The polyurethane sheets are preferably based on polyurethanes which have thermoplastic properties. Suitable polyurethanes having thermoplastic properties may be prepared in accordance with U.S. Patent 2,729,618. Thus, for example, an organic poly isocyanate is reacted with a relatively long chain polyol and a relatively short chain polyol until a solid but still thermoplastic material is obtained. Then the reaction is interrupted and the plastic is extruded, calendered or pressed into a sheet which may be used to produce the article of the present invention. It is desirable to pre-mix a diol having a molecular weight of from about 1000 to about 3000 with a diol having a molecular weight below about 500 and then reacting this mixture under substantially anhydrous conditions with an organic diisocyanate until a product having thermoplastic properties is obtained, and then interrupting the reaction. It is particularly desirable for use in accordance with the present invention to use a polyester of polyether diol as the polyol having a molecular weight of from about 1000 to about 3000 and a dihydric alcohol having a molecular weight below about 500, together with an aliphatic diisocyanate such as 1,4-butane diisocyanate, 1,2-isocyanatomethyl cyclobutane, 1,6-hexamethylene diisocyanate, 1,4-cyclohexane diisocyanate, 4,4'-dicyclohexylmethane diisocyanate, 1,10-decane diisocyanate and the like. It is preferred that the aliphatic diisocyanates employed in accordance with the present invention have from about 4 to 10 carbon atoms, and they may be either linear, branched or cyclic. Particularly suitable polyols are polypropylene ether glycol having a molecular weight of 2000, polybutylene ether glycol having a molecular weight of 1500, a polyester prepared by reacting adipic acid with ethylene glycol to a molecular weight of 2000 and the like. The preferred diols having a molecular weight below about 500 are 1,4-butane diol, diethylene glycol, the bis-beta-hydroxy ethyl ether of hydroquinone and the like.

In general, however, any suitable organic diisocyanate or polyol may form the basis for the polyurethane. Suitable organic polyisocyanates include, for example, aromatic, aliphatic and heterocyclic polyisocyanates such as 2,4- and 2,6-toluylene diisocyanate, 4,4'-diphenylmethane diisocyanate, 1,5-naphthalene diisocyanate, furfurylidene diisocyanate and the like in addition to those disclosed above. Furthermore, any suitable polyol may be used including a polyester based on a lactone or on polycarboxylic acids and polyhydric alcohol such as sebacic acid, oxalic acid, phthalic acid, terephthalic acid and the like and 1,4-butane diol, propylene glycol, diethylene glycol, trimethylolpropane, glycerine and the like. Aliphatic and alicyclic diamines, hydrazine and water may also be used as partial or complete replacement for the glycol curing agent. Suitable amines etc. include ethylene diamine, 1,3-propylene diamine, 1,4-butane diamine, hexamethylene diamine, 1,4-cyclohexylene diamine and the like. Substituted hydrazines including N,N'-dimethyl hydrazine and the like may be used.

The thermoplastic polyurethanes are usually prepared as set forth above by pre-reacting the organic diisocyanate with the mixture of polyols for about 15 minutes at a temperature of from about 100° C. to about 120° C. and then cooling the reaction mixture to a temperature below about 30° C. in order to interrupt the reaction and produce a thermoplastic product which has free —NCO groups. Suitable thermoplastic polyurethanes may also be prepared in the same way using a slight excess of equivalents of hydroxyl groups, but those having a slight excess of isocyanate groups are preferred.

In preparing the final preferred structural glass of this invention, the sheets are assembled one on top of the other with the polycarbonate in the center sandwiched by polyurethane sheets and glass sheets respectively and then the assembled laminate is subjected to heat and pressure sufficient to cause permanent adherance of one layer to the other. It is preferred to pre-dry the polycarbonate sheets prior to assembling the laminate. After assembly of the laminate, as mentioned above, it is preferred to warm the assembly. Desirably, the warm assembled laminate is passed through de-airing rolls to lightly adhere the layers together and expel the air. This can subsequently be passed through tacking rolls. The warm lightly adhered laminate is then preferably passed into an oil autoclave or other high pressure equipment and heated to a temperature of preferably about 250 to 400° F. at a pressure of preferably at least about 50 p.s.i. (suitably about 100 to 500 p.s.i.) for any suitable time say, for example, about 10 to 15 minutes. The oil is preferably allowed to reach temperature before any significant pressure is applied, but it is understood that the pressure is sufficient to hold the laminate together during the initial heat-up period in the autoclave. The assembly is allowed to cool to about 150° F. or lower while still under pressure and then the pressure is removed and the complete assembly is washed with water and detergent to remove the oil. Laminates prepared in this manner have exceptional load bearing properties and are suitable for structural or engineering purposes. It is preferred to use a pressure of about 100 to 200 p.s.i. and it is preferred to employ temperatures of about 350 to 400° F. in the preparation of the structural glass laminates.

The structural laminated glass of the invention is useful in many areas where it was impossible to use glass heretofore, for example, for the preparation of windshields for automobiles which eliminate the need for cornerposts by forming not only the windshield but also the supporting member for the roof of the automobile.

The laminated article of the invention overcomes many of the disadvantages of the prior method of adhering glass to polycarbonate because the polyurethane renders the laminated article much more resistant to high temperatures than the heretofore known materials. For example, the upper temperature limit for conventional safety glass laminated with polyvinyl butyral is 150° F. whereas the laminated article of the present invention is unchanged at 200° F. and higher temperatures in many cases do not harm the laminant. Furthermore, the laminated article due to the elastic character of the polyurethane is able to absorb more energy and thus is able to withstand greater impact. Still a further advantage of the invention is that even though the glass becomes shattered as with the blow from a hammer, the adhesion is so high that literally none of the glass breaks away from the polycarbonate layer.

The invention is further illustrated by the following examples in which parts are by weight unless otherwise specified.

EXAMPLE 1

A sheet of plate glass about 4 x 4 inches having a thickness of about 125 mils is covered with a sheet of polyurethane having a thickness of about 12 mils, a sheet of polycarbonate having a thickness of about 90 mils and which is prepared according to U.S. Patent 3,117,009 from phosgene and 2,2-bis-(4-hydroxy phenyl)-propane, said polycarbonate having a relative viscosity of about 1.35 measured in methylene chloride at 25° C. is placed on top of the polyurethane. Then another sheet of polyurethane and another sheet of glass identical to the first two sheets are placed on the polycarbonate in the order named and the structural glass is pressed for about one minute at about 100 p.s.i.g. in a press having a plate temperature of about 360° F. The pressure is released and the resulting piece of structural glass when struck with a hammer breaks the glass, but the glass does not release from the polycarbonate. Further, the laminant is unaffected by a temperature of 200° F. The polyurethane sheet employed in this example is prepared by mixing about 100 parts of a polyester having a molecular weight of about 2000 and an hydroxyl number of about 56 prepared from adipic acid and ethylene glycol with about 6.2 parts of the bis-beta-hydroxy-ethyl ether of hydroquinone and reacting the mixture with about 14.6 parts of 1,6-hexane diisocyanate for about 15 minutes at a temperature of about 250° F. and then cooling the reaction mixture to 75° F. to interrupt the reaction and produce a solid thermoplastic product having free —NCO. This material is then diced and calendered into sheets.

EXAMPLE 2

The foregoing example is repeated except that the polyurethane is prepared by reacting 100 parts of a polyester having a molecular weight of about 2000 and an hydroxyl number of 56 based on 1,4-butane diol and adipic acid, mixed with 9 parts of 1,4-butane diol with 40 parts of 4,4'-diphenylmethane diisocyanate. The components are heated to 110° C. for about 15 minutes and then cooled to room temperature in order to obtain a thermoplastic solid product having free —NCO groups.

EXAMPLE 3

Example 1 is repeated except that the plate glass is replaced with chemically tempered glass having a thickness of about 60 mils and sold under the trade-name Chemcor by Corning Glass Works.

It is to be understood that the foregoing examples are given for the purpose of illustration and that any other suitable glass, polyurethane, polyarylcarbonate or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A laminated article which comprises a sheet of polyarylcarbonate sandwiched between sheets of polyurethane which are in turn sandwiched between sheets of glass.
2. A five layer laminated glass article having high load bearing properties which comprises a sheet of the polyarylcarbonate, two sheets of polyurethane and two sheets of glass, a flat surface of each sheet of polyurethane being adhesively bonded to said polycarbonate sheet and the other flat surface of each of said polyurethane sheets being adhesively bonded to a surface of one of each of said glass sheets.

3. A five layer laminated glass article having high load bearing properties and a thickness of from about 140 to about 380 mils which comprises a sheet of polyarylcarbonate having a thickness of from about 60 to about 100 mils, two sheets of polyurethane having a thickness of from about 10 to about 30 mils and two sheets of prestressed glass having a thickness of from about 60 to about 125 mils, one flat surface of each sheet of polyurethane being adhesively bonded to said polycarbonate sheet and the other flat surface of each of said polyurethane sheets being adhesively bonded to a surface of each of said glass sheets.

4. A five layer laminated glass article having high load bearing properties and a thickness of from about 140 to 380 mils which comprises a sheet of polyarylcarbonate having a thickness of about 60 to 100 mils, two sheets of polyurethane having a thickness of from about 10 to 30 mils and two sheets of prestressed glass having a thickness of from about 60 to 125 mils, one flat surface of each sheet of polyurethane being adhesively bonded to said polycarbonate sheet and the other flat surface of each of said polyurethane sheets being adhesively bonded to a surface of each of said glass sheets, said polyurethane sheets having been prepared by a process which comprises reacting an organic polyisocyanate with a polyol.

5. The laminated glass article of claim 4 wherein each of said polyurethane sheets is prepared by a process which comprises reacting an organic diisocyanate with a mixture of diols, one diol having a molecular weight of from about 1000 to about 3000 and another diol having a molecular weight below about 500 until a solid thermoplastic polyurethane having free —NCO groups is obtained.

6. The laminated article of claim 4 wherein said polyurethane is based on the reaction of an aliphatic diisocyanate, a polyester polyol having a molecular weight of from about 1000 to about 3000 and a dihydric alcohol having a molecular weight below about 500.

7. The laminated article of claim 4 wherein said polyurethane is based on the reaction of an alicyclic diisocyanate, a polyester polyol having a molecular weight of from about 1000 to about 3000 and a dihydric alcohol having a molecular weight below about 500.

8. The laminated article of claim 4 wherein said polyurethane is based on a hexamethylene diisocyanate reaction product.

9. A laminated article comprising two sheets of polyurethane bonded to each other by a polyarylcarbonate interlayer.

10. The laminated article of claim 9 wherein said polyurethane sheets are prepared by a process which comprises reacting a polyester polyol with an excess of an organic diisocyanate to prepare a solid thermoplastic prepolymer which is then formed into a sheet having a thickness of from about 10 to 45 mils.

11. The laminated article of claim 9 wherein said polyarylcarbonate interlayer is based on the reaction of phosgene with 2,2-bis-(4-hydroxyl)-propane.

References Cited

UNITED STATES PATENTS

| 2,864,780 | 12/1958 | Katz et al. | 161—190 X |
| 3,341,391 | 9/1967 | Hamilton et al. | 161—83 X |

OTHER REFERENCES

G. E. Lexan, "Polycarbonate Resins," Tech. Report C.D.C.–502, January 1962, pp. 7 and 8.

EARL M. BERGERT, *Primary Examiner.*

HAROLD ANSHER, *Examiner.*